No. 626,865. Patented June 13, 1899.
R. P. JOHNSON.
PROCESS OF MANUFACTURING WHITING.
(Application filed July 7, 1898.)
(No Model.)

Witnesses:
A. C. Harwood
James M. Urquhart

Inventor:
Richard P. Johnson.
by Crosby & Gregory,
Attys.

UNITED STATES PATENT OFFICE.

RICHARD P. JOHNSON, OF BOSTON, MASSACHUSETTS, ASSIGNOR TO FREDERICK N. TIRRELL, OF SAME PLACE.

PROCESS OF MANUFACTURING WHITING.

SPECIFICATION forming part of Letters Patent No. 626,865, dated June 13, 1899.

Application filed July 7, 1898. Serial No. 685,321. (No specimens.)

*To all whom it may concern:*

Be it known that I, RICHARD P. JOHNSON, of Boston, county of Suffolk, State of Masachusetts, have invented an Improvement in Processes of Manufacturing Whiting, of which the following description, in connection with the accompanying drawings, is a specification, like letters on the drawings represent like parts.

This invention has for its object the rapid and effective separation of whiting into two or more grades in an economical manner, whereby the greater part of the whiting so separated will be of a high grade or quality.

Whiting is graded commercially according to the fineness of the division of its particles, the greater the fineness the higher the grade or quality, and heretofore the grading has been effected in a slow and somewhat unsatisfactory manner by a series of flotations and screenings, with the result that the finer grades obtained formed a comparatively small proportion of a given quantity of raw material treated. By my present invention I have reversed the results, obtaining but a small quantity of inferior or low-grade whiting proportionally to the quantity of raw material treated.

I have herein shown a form of apparatus well adapted to carrying out my process.

Figure 1:
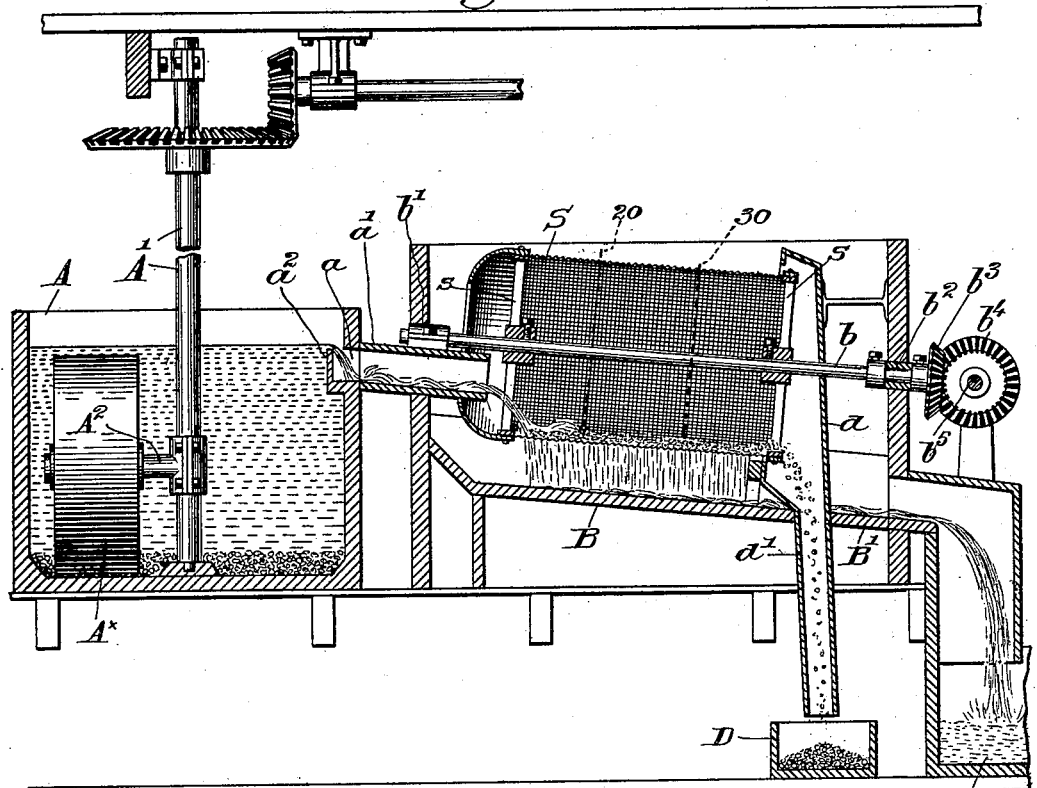
Figure 2:
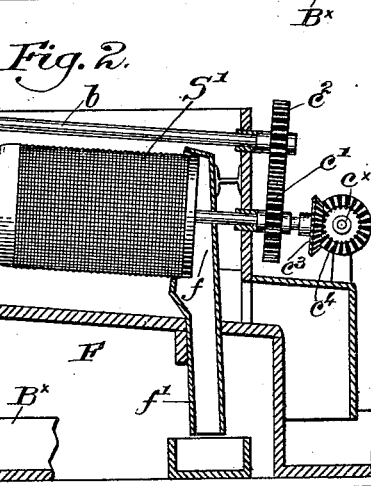

Figure 1 is a longitudinal sectional view of one form of apparatus adapted to carry out my novel process, and Fig. 2 is a modified form of apparatus to be described.

Referring to Fig. 1, a vat or muller A receives the crude material or chalk to be ground, an upright shaft $A'$, having a lateral stud $A^2$, on which is rotatably mounted a suitable grinder or pulverizer $A^\times$, the shaft $A'$ being rotated by any suitable means. At the upper part of one of the side walls of the vat a discharge-port $a$ opens into a pipe or other passage $a'$, a dam or lip $a^2$ within the vat guarding the port for a purpose to be described. The outer end of the pipe $a'$ is shown as extended into the open upper end of a tubular screen S of suitable material and having meshes or interstices of the desired degree of fineness, the screen-surface being mounted on spiders $s$, attached to a rotatable shaft $b$, having suitable bearings $b'$ $b^2$ and inclined in the direction of its length. A gear $b^3$ on the shaft meshes with a gear $b^4$ on a shaft $b^5$, driven from any suitable source of power (not shown) to rotate the screen at a rather high speed. Below the screen an inclined pan or tank B receives the material which passes through the screen-walls, said pan having a delivery-chute $B'$, from which the contents pass to a settling-tank $B^\times$. The open lower end of the screen is inclosed in a hood $d$, which is reduced at its lower end to a pipe $d'$, which passes through the bottom of the pan B and discharges into any suitable receptacle D.

In the operation of the apparatus the crude chalk is placed in the muller A, which is constantly supplied with water, and is ground or finely divided by the grinding-roll, the finely-divided particles being held in suspension in the liquid and rising to the top. The lip or dam $a^2$ determines the level of the liquid in the muller, the excess flowing over into the discharge-passage $a'$ and carrying with it the finely-divided material in suspension. A constant stream of liquid and finely-divided solid matter thus flows into the upper end of the revolving screen S, and the speed of rotation is such that the centrifugal force acts to force the particles of sufficient fineness through the screen-interstices, passing thence with a portion of the liquid into the pan B, and thence to suitable settling-tanks $B^\times$.

In practice I have obtained highly satisfactory results by giving the screen about sixty revolutions per minute, the fineness of the screen being determined by circumstances— say, eighty or one hundred and twenty mesh.

While whiting is held in suspension in a liquid, it may be readily and rapidly screened so long as the screen is kept in motion constantly, and a very high percentage of the finely-divided material will pass through the screen by my process. The residue, which consists of particles too large to pass through the screen-interstices, grit, and other impurities, is discharged from the lower end of the screen into the hood and passes to the receptacle D to be reground and screened, if desired. As a matter of fact, however, in many instances the amount of whiting in the residue is so small that its recovery is not a matter of any moment.

It will be observed that I obtain one grade of whiting in the pan B, its quality depending on the fineness of the screen mesh, and it is the major part of the raw material treated.

In Fig. 2 I have shown an addition to the apparatus shown in Fig. 1, whereby the residue of the first screening is passed through a screen of somewhat larger mesh, thus getting first and second grades of whiting at one operation. The discharge-spout of the hood $d$ opens into a second screen S', its shaft $c$ being connected by a gear $c'$ with a gear $c^2$ on the shaft $b$ of the first screen, the shaft $c$ being positively driven in Fig. 2 from a shaft $c^\times$ by gears $c^3 c^4$. A hood $f$ for the lower end of screen S' receives and conducts the final residue away through a spout $f'$, while the screened whiting passes into a pan F.

When using two screens, the first one may be of one hundred and twenty mesh and the second eighty mesh, and it will be obvious that three screens arranged in succession may be used or a greater number, if desired. Obviously the same result would be obtained by dividing a single screen into sections of different mesh, the finest at the upper end of the screen and graded down. Such an arrangement is shown in Fig. 1 by the dotted lines 20 30, which divide the screen into three sections, and of course a separate pan will be placed below each section, from which the several graded products may be conducted to settling-tanks.

So far as I am aware it has been impossible heretofore to produce an unlimited quantity of any positive grade or quality of whiting which will stand a test for uniformity, whereas by my invention I can produce an absolutely uniform product in unlimited quantity or a plurality of positive grades in a rapid and economical manner.

The practice of my invention enables me to do away with the large number of floating-tanks heretofore necessary and covering a great amount of floor-space, for by my process only one tank is necessary for each grade of whiting, and the transportation of the product from distant parts of the mill is obviated.

Having fully described my invention, what I claim, and desire to secure by Letters Patent, is—

1. The process of manufacturing whiting, which consists in flowing a constant stream of a liquid holding in suspension the whiting in a finely-divided state through a tubular screen, and continuously rotating the screen with sufficient rapidity to effect the passage of the fine particles and a portion of the liquid through the interstices of the screen.

2. In the manufacture of whiting, the process of grading the whiting by causing the same while suspended in liquid in a finely-divided state to pass through a screen by centifugal force, to thereby separate the fine particles from the residue.

3. The process of manufacturing whiting, which consists in pulverizing the material, and thereafter by water or other liquid holding the particles in suspension, and causing the same to pass over a rapidly-rotated screening-surface, whereby the liquid and fine particles are driven through the screening-surface and separated from the residue by centrifugal force.

4. The process of manufacturing whiting, which consists in finely dividing the material in an excess of water, drawing off therefrom a continuous supply of water with the whiting in a finely-divided state in suspension, and delivering such stream to the interior of a tubular screen rotated at a speed sufficient to cause the fine particles of whiting in suspension to pass through the interstices of the screen by or through centrifugal force.

In testimony whereof I have signed my name to this specification in the presence of two subscribing witnesses.

RICHARD P. JOHNSON.

Witnesses:
JOHN C. EDWARDS,
FREDERICK N. TIRRELL.